United States Patent
Huang et al.

(10) Patent No.: US 8,811,311 B2
(45) Date of Patent: Aug. 19, 2014

(54) METHOD AND APPARATUS FOR PERFORMING RANDOM ACCESS PROCEDURE USING SOFT DEDICATED PREAMBLES

(75) Inventors: Min Huang, Beijing (CN); Yong Teng, Beijing (CN); Juha Korhonen, Espoo (FI)

(73) Assignee: Nokia Corporation, Espoo (FI)

( * ) Notice: Subject to any disclaimer, the term of this patent is extended or adjusted under 35 U.S.C. 154(b) by 266 days.

(21) Appl. No.: 13/001,366

(22) PCT Filed: Jun. 23, 2009

(86) PCT No.: PCT/IB2009/006034
§ 371 (c)(1),
(2), (4) Date: Dec. 23, 2010

(87) PCT Pub. No.: WO2009/156826
PCT Pub. Date: Dec. 30, 2009

(65) Prior Publication Data
US 2011/0134862 A1    Jun. 9, 2011

Related U.S. Application Data

(60) Provisional application No. 61/074,894, filed on Jun. 23, 2008.

(51) Int. Cl.
*H04W 72/04* (2009.01)
*H04W 74/08* (2009.01)
(52) U.S. Cl.
CPC .................................. *H04W 74/08* (2013.01)
USPC ...................................................... 370/329

(58) Field of Classification Search
CPC .......... H04W 74/0833; H04W 52/281; H04W 52/325; H04W 52/50; H04W 72/0413; H04W 72/0426; H04W 72/0446; H04W 52/08; H04W 52/10; H04W 52/44; H04W 64/006; H04W 74/006; H04W 74/0866; H04L 27/2613
USPC ........................... 370/254–340; 709/201–213
See application file for complete search history.

(56) References Cited

U.S. PATENT DOCUMENTS 8,406,201 B2 *   3/2013   Vujcic ............................ 370/335
8,520,644 B2 *   8/2013   Lee et al. ....................... 370/336
(Continued)

FOREIGN PATENT DOCUMENTS

CN              1996806 A       7/2007
WO       WO 2007/052971 A1      5/2007
(Continued)

OTHER PUBLICATIONS

3GPP TS 36.321 v8.1.0, 3rd Generation Partnership Project; Technical Specification Group Radio Access Network; Evolved Universal Terrestrial Radio Access (E-UTRA) Medium Access Control (MAC) protocol specification (Release 8), Mar. 2008.
(Continued)

*Primary Examiner* — Ayaz Sheikh
*Assistant Examiner* — Debebe Asefa
(74) *Attorney, Agent, or Firm* — Harrington & Smith

(57) ABSTRACT

An approach for performing a random access procedure using soft-dedicated preambles is disclosed. A module designates one of a plurality of preambles, associated with one or more random access channels, as a soft-dedicated preamble. The soft-dedicated preamble is used by a user equipment that is either contention-based or non-contention-based.

20 Claims, 13 Drawing Sheets

(56) References Cited

U.S. PATENT DOCUMENTS

2008/0101306 A1* 5/2008 Bertrand et al. ............... 370/336
2009/0092086 A1 4/2009 Lee et al. ...................... 370/329

FOREIGN PATENT DOCUMENTS

WO  2007147808 A1  12/2007
WO  2009022878 A1  2/2009
WO  2009022880 A1  2/2009

OTHER PUBLICATIONS

R1-081691 TDD RACH Configurations, ZTE, RAN1#52b Shenzhen, Apr. 2008.

3GPP TS 36.211 v8.2.0, 3rd Generation Partnership Project; Technical Specification Group Radio Access Network; Evolved Universal Terrestrial Radio Access (E-UTRA); Physical Channels and Modulation (Release 8), Mar. 2008.

3GPP TS 36.300 v8.4.0 3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Mar. 2008.

International Search Report and Written Opinion of the International Searching Authority from PCT Application No. PCT/IB2009/006034, dated Nov. 2, 2009, 20 pages.

Ericsson, "On the details of the dedicated preamble at intra-LTE handover", 3GPP TSG-RAN WG2 #58-bis, Orlando, Florida, US, vol. R2-072549, Jun. 2007.

China Mobile, "Overload Handling for Non-Contention based RACH", 3GPP TSG-RAN WG2 #61, Sorrento, Italy, vol. R2-080751, Feb. 2008.

Ghosh, et al., "Random Access Design for UMTS Air-Interface Evolution", Vehicular Technology Conference, Apr. 2007.

3GPP TR 23.882 V8.0.0 (Sep. 2008); 3rd Generation Partnership Project; Technical Specification Group Services and System Aspects; 3GPP System Architecture Evolution: Report on Technical Options and Conculsions (Release 8) (234 pages).

3GPP TR 25.813 V7.0.0 (Jun. 2006) 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7) (39 pages).

3GPP TR 25.814 V7.1.0 (Sep. 2006) 3rd Generation Partnership Project; Technical Specification Group Radio Access Network; Physical layer aspects for evolved Universal Terrestrial Radio Access (E-UTRA) (Release 7) (132 pages).

* cited by examiner

METHOD AND APPARATUS FOR PERFORMING RANDOM ACCESS PROCEDURE USING SOFT DEDICATED PREAMBLES

RELATED APPLICATION

This application was originally filed as PCT Application No. PCT/IB2009/006034 on Jun. 23, 2009 and claims priority to U.S. Provisional Application No. 61/074,894 filed on Jun. 23, 2008, which is incorporated herein by reference in its entirety.

FIELD OF INVENTION

The present application relates to a method and apparatus for performing random access procedure using soft-dedicated preambles.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves communicating using random access channels, which permits securing of network resources without prior negotiation for such resources.

The random access procedure is performed for the following five events (as detailed in 3GPP TS 36.300 v8.4.0, which is incorporated herein by reference in its entirety): (1) Initial access from RRC_IDLE (Radio Resource Control); (2) Initial access after radio link failure; (3) Handover requiring random access procedure; (4) Downlink (DL) data arrival during RRC_CONNECTED requiring random access procedure, e.g. when UL synchronization status is "non-synchronized"; and (5) UL data arrival during RRC_CONNECTED requiring random access procedure, e.g., when UL synchronization status is "non-synchronized" or there are no PUCCH resources for SR available.

Furthermore, the random access procedure takes two distinct forms: contention based (applicable to all five events), and non-contention based (applicable to only handover and DL data arrival).

Therefore, there is a need for an approach for providing efficient signaling, which can co-exist with already developed standards and protocols.

Some Example Embodiments

According to one embodiment, a method comprises designating one of a plurality of preambles, associated with one or more random access channels, as a soft-dedicated preamble. The soft-dedicated preamble is used to access one of the random access channels by a user equipment that is either contention-based or non-contention-based.

According to another embodiment, a computer-readable medium carries one or more sequences of one or more instructions which, when executed by one or more processors, cause an apparatus to designate one of a plurality of preambles, associated with one or more random access channels, as a soft-dedicated preamble. The soft-dedicated preamble is used to access one of the random access channels by a user equipment that is either contention-based or non-contention-based.

According to another embodiment, an apparatus comprises a preamble control logic configured to designate one of a plurality of preambles, associated with one or more random access channels, as a soft-dedicated preamble. The soft-dedicated preamble is used to access one of the random access channels by a user equipment that is either contention-based or non-contention-based.

According to another embodiment, an apparatus comprises means for designating one of a plurality of preambles, associated with one or more random access channels, as a soft-dedicated preamble. The soft-dedicated preamble is used to access one of the random access channels by a user equipment that is either contention-based or non-contention-based.

According to another embodiment, a method comprises receiving configuration information specifying use of a soft-dedicated preamble and associated selection probability. The method also comprises selecting the soft-dedicated preamble from a plurality of preambles. The soft-dedicated preamble is used by a user equipment that is either contention-based or non-contention-based.

According to another embodiment, a computer-readable medium carries one or more sequences of one or more instructions which, when executed by one or more processors, cause an apparatus to receive configuration information specifying use of a soft-dedicated preamble and associated selection probability. The apparatus is also caused to select the soft-dedicated preamble from a plurality of preambles. The soft-dedicated preamble is used by a user equipment that is either contention-based or non-contention-based.

According to another embodiment, an apparatus comprises a preamble control logic configured to receive configuration information specifying use of a soft-dedicated preamble and associated selection probability. The preamble control logic is also configured to select the soft-dedicated preamble from a plurality of preambles. The soft-dedicated preamble is used by a user equipment that is either contention-based or non-contention-based.

According to yet another embodiment, an apparatus comprises means for receiving configuration information specifying use of a soft-dedicated preamble and associated selection probability. The apparatus also comprises means for selecting the soft-dedicated preamble from a plurality of preambles. The soft-dedicated preamble is used by a user equipment that is either contention-based or non-contention-based.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

An apparatus, method, and software for providing a random access procedure using soft-dedicated preambles ("s-preamble") are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1:
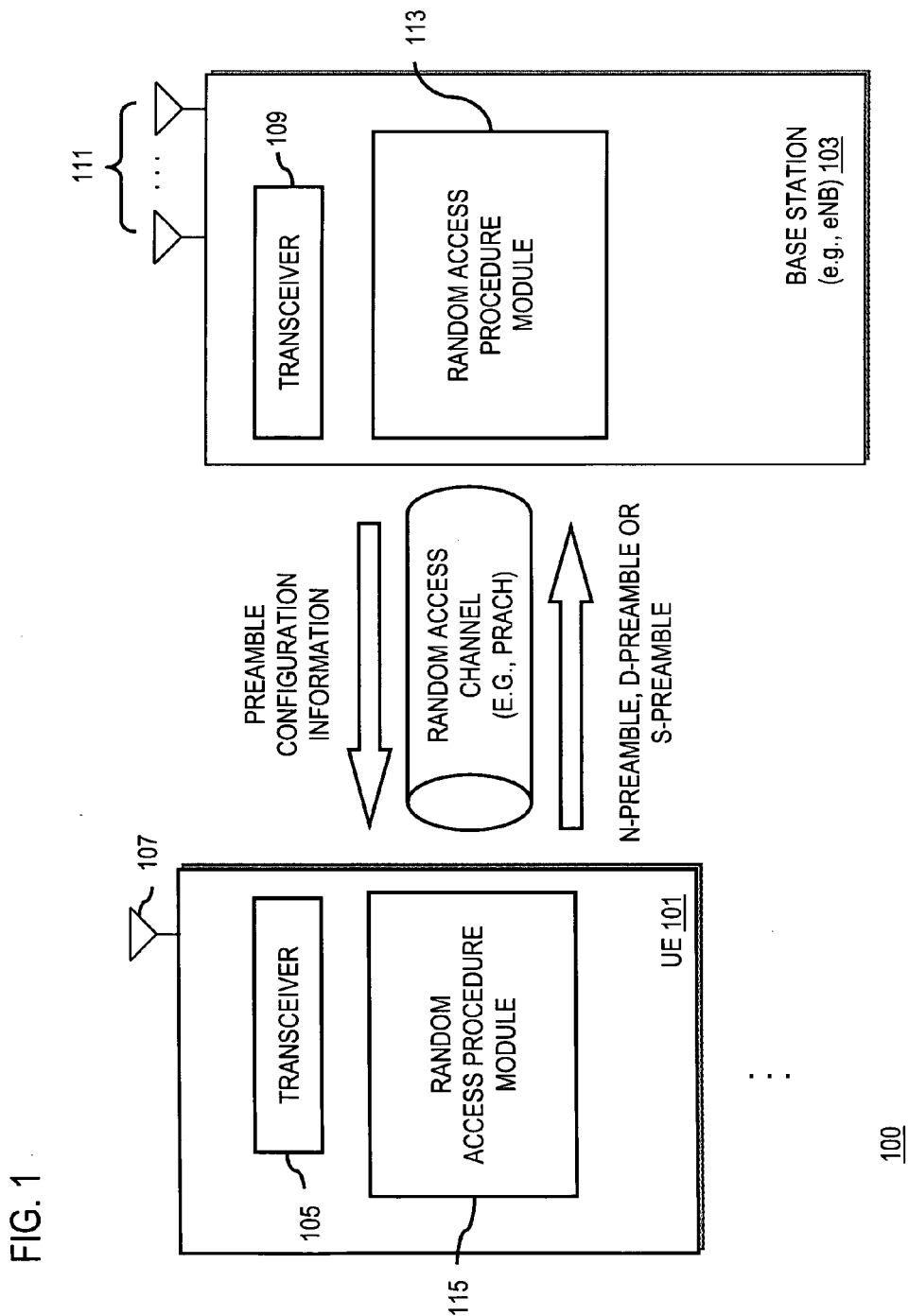
FIG. 1 is a diagram of a communication system capable of providing a random access procedure utilizing soft-dedicated preambles for contention based user equipment as well as contention free user equipment, according to an exemplary embodiment.

FIG. 1 is a diagram of a communication system capable of providing a random access procedure utilizing soft-dedicated preambles for contention based user equipment as well as contention free user equipment, according to an exemplary embodiment. As shown in FIG. 1, one or more user equipment (UEs) 101 communicate with a base station 103, which is part of an access network (e.g., 3GPP LTE (or E-UTRAN, etc.). Under the 3GPP LTE architecture (as shown in FIGS. 8A-8D), the base station 103 is denoted as an enhanced Node B (eNB). The UE 101 can be any type of mobile stations, such as handsets, terminals, stations, units, devices, multimedia tablets, Internet nodes, communicators, Personal Digital Assistants (PDAs) or any type of interface to the user (such as "wearable" circuitry, etc.). The UE 101 includes a transceiver 105 and an antenna system 107 that couples to the transceiver 105 to receive or transmit signals from the base station 103. The antenna system 107 can include one or more antennas.

As with the UE 101, the base station 103 employs a transceiver 109, which transmits information to the UE 101. Also, the base station 103 can employ one or more antennas 111 for transmitting and receiving electromagnetic signals. For instance, the Node B 103 may utilize a Multiple Input Multiple Output (MIMO) antenna system 111, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

Communications between the UE 101 and the base station 103 (and thus, the network) is governed, in part, by control information exchanged between the two entities. Such control information, in an exemplary embodiment, is transported over a control channel on, for example, the downlink from the base station 103 to the UE 101.

To ensure accurate delivery of information between the eNB 103 and the UE 101, the system 100 utilizes error detection to exchange information, e.g., Hybrid ARQ (HARQ). HARQ is a concatenation of Forward Error Correction (FEC) coding and an Automatic Repeat Request (ARQ) protocol. Automatic Repeat Request (ARQ) is an error detection mechanism used on the link layer. As such, this error detection scheme, as well as other schemes (e.g., CRC (cyclic redundancy check)), can be performed by error detection modules (not shown) within the eNB 103 and UE 101, respectively. The HARQ mechanism permits the receiver (e.g., UE 101) to indicate to the transmitter (e.g., eNB 103) that a packet or sub-packet has been received incorrectly, and thus, requests the transmitter to resend the particular packet(s).

By way of example, a number of communication channels are defined for use in the system 100. The channel types include: physical channels, transport channels, and logical channels. Physical channels can include a physical downlink shared channel (PDSCH), a dedicated physical downlink dedicated channel (DPDCH), a dedicated physical control channel (DPCCH), etc. The transport channels can be defined by how they transfer data over the radio interface and the characteristics of the data. The transport channels include a broadcast channel (BCH), paging channel (PCH), a dedicated shared channel (DSCH), etc. Other exemplary transport channels are an uplink (UL) Random Access Channel (RACH), Downlink Shared Channel (DL-SCH), Uplink Shared Channel (UL-SCH), Broadcast Channel (BCH), and Paging Channel (PCH). A dedicated transport channel is the UL/DL Dedicated Channel (DCH). Each transport channel is mapped to one or more physical channels according to its physical characteristics.

Each logical channel can be defined by the type and required Quality of Service (QoS) of information that it carries. The associated logical channels include, for example, a broadcast control channel (BCCH), a paging control channel (PCCH), Dedicated Control Channel (DCCH), Common Control Channel (CCCH), Shared Channel Control Channel (SHCCH), Dedicated Traffic Channel (DTCH), Common Traffic Channel (CTCH), etc.

The BCCH (Broadcast Control Channel) can be mapped onto both BCH and DSCH. As such, this is mapped to the PDSCH; the time-frequency resource can be dynamically allocated by using L1/L2 control channel (PDCCH). In this case, BCCH (Broadcast Control Channel)-RNTI (Radio Network Temporary Identities) is used to identify the resource allocation information.

In terms of the assignment of dedicated random access preamble, L1/L2 control signal can be used (although it is contemplated that Medium Access Control (MAC) layer signaling can alternatively be utilized). As for timing advance (TA) information signaling, both types of signaling can be specified in LTE. When UE 101 is in UL-synchronization and there is DL data, the TA information can be sent in DL MAC control signal. However, if UE 101 is not in UL-synchronization, or there is no DL data to be transmitted and no resource allocation, TA information can be sent via L1/L2 control signal for optimization.

The system 100 provides an efficient mechanism for a random access (RA) process, as provided by random access procedure modules 113 and 115, within the base station 103 and UE 101, respectively. The system 100 employs an RA mechanism whereby a certain amount of preambles are defined as "soft-dedicated preamble," which could be shared for both contention based UE and contention free UE.

To better appreciate this approach, it is instructive to describe a conventional RA procedure. In a random access procedure according to one LTE specification, the first operation for a UE 101 is to transmit a RA preamble in a physical random access channel (PRACH), which is denoted as "message 1." Then, eNB 103 detects the receiving of all message 1's transmitted by the UE 101 and judges which preambles are transmitted for each PRACH; this process is more fully detailed in 3GPP TS 36.321 v8.1.0 (which is incorporated by reference herein in its entirety). In the design of RA preambles in LTE, the orthogonality between any two preambles can be guaranteed, i.e., any two different preambles in the same PRACH can be distinguished by eNB 103. If two UEs 101 apply the same preamble in the same PRACH, a collision would occur and the two UEs 101 can be considered to have failed in this RA occasion.

Two types of random access, contention-based RA and non-contention-based RA, result in two types of RA preambles: non-dedicated preambles ("n-preamble") and dedicated preambles ("d-preamble"). For contention-based RA, each UE 101 joins in the contention with equality and selects one of non-dedicated preambles to transfer message 1. For non-contention-based RA, an amount of dedicated preambles with associated expiration times are reserved to those UEs 101 with, for instance, handover and downlink data arrival, as more fully detailed in 3GPP TS 36.321 v8.1.0 and 3GPP TS 36.300 v8.4.0 (which is incorporated by reference herein in its entirety). Using this convention, those UEs 101 that utilize d-preambles to perform, e.g., handover or downlink data arrival, are denoted as "d-UEs" or "non-contention-based UEs"; and those UEs 101 that utilize n-preambles to perform contention-based RA are denoted as "n-UEs" or "contention-based UEs."

For example, the conventional mechanism for preamble selection is as follows. First, each cell or sector allocates a certain amount of d-preambles for the d-UEs, and the other preambles are used as n-preambles for the n-UEs. As defined, an n-UE cannot use any of the d-preambles reserved for d-UEs. Moreover, each n-UE selects among n-preambles with equal probability.

Next, if the number of d-UEs whose expiration times have not expired is more than the number of d-preambles, those extra d-UEs with no corresponding d-preambles would lose their priority and join with the n-UEs for contention for available n-preambles. In other words, the extra d-UEs are effectively changed to n-UEs.

If the expiration time for a d-UE expires, this d-UE would also join in contention with the n-UEs. The configuration of d-preamble and n-preamble, such as their split ("split" means the division location in the preamble sequence) are broadcasted to all UEs 101.

Although the above mechanism is simple, it lacks the flexibility to deal with changes in the relative numbers of n-UEs versus d-UEs. To achieve efficiency, the number of d-preambles should closely match to the number of d-UEs. An excessive number of d-preambles wastes valuable preamble resources. On the other hand, if there are not enough of d-preambles for all d-UEs, some d-UEs would join the n-UEs in contention for n-preambles, resulting in a potentially significant decline in the RA success ratio. Additionally, although the number of d-preambles can be adaptively adjusted, the number of d-UEs cannot be precisely estimated by the eNB 103. Moreover, it is difficult to timely convey any changes in the sizes of the various preamble groups (e.g., n-preambles and d-preambles) to the UE 101.

Another drawback of the conventional mechanism is that different classes of d-UEs (e.g., requiring different service levels) are not considered. For example, a UE 101 in a handover process generally has the highest priority for obtaining a preamble. With the class of UEs 101 engaged in handover, there could be additional differentiating classes. For example, UEs 101 that are fast moving and/or far away from the source cell have higher priority. Next in line of priority are UEs 101 with urgent downlink data, as well as those UEs 101 with loose timing requirements. However, the conventional RA process has no mechanism to readily distinguish these different classes of d-UEs.

In recognition of the above problems, the system 100 provides a new preamble design, which (1) can adapt to the a changing number of d-UEs, (2) need not frequently estimate and broadcast the preamble information or configuration to the UEs 101, and (3) can be used to distinguish different classes of d-UEs. The system 100 employs an RA mechanism whereby a certain amount of preambles are defined as "soft-dedicated preambles" (s-preambles) which could be shared for both contention-based UEs 101 (d-UEs) and non-contention-based UEs 101 (n-UEs). In one embodiment, for contention-based UEs 101, the s-preambles are assigned a lower selection probability relative to n-preambles. In this way, it is less likely that s-preambles would be subjected to high or severe levels of contention for their use. For non-contention-based UEs 101, the s-preambles are used, for instance, only if all of the available d-preambles have already been used. Under this option, the s-preambles would be used according to a sequence, e.g., by their indexes.

Figure 2:
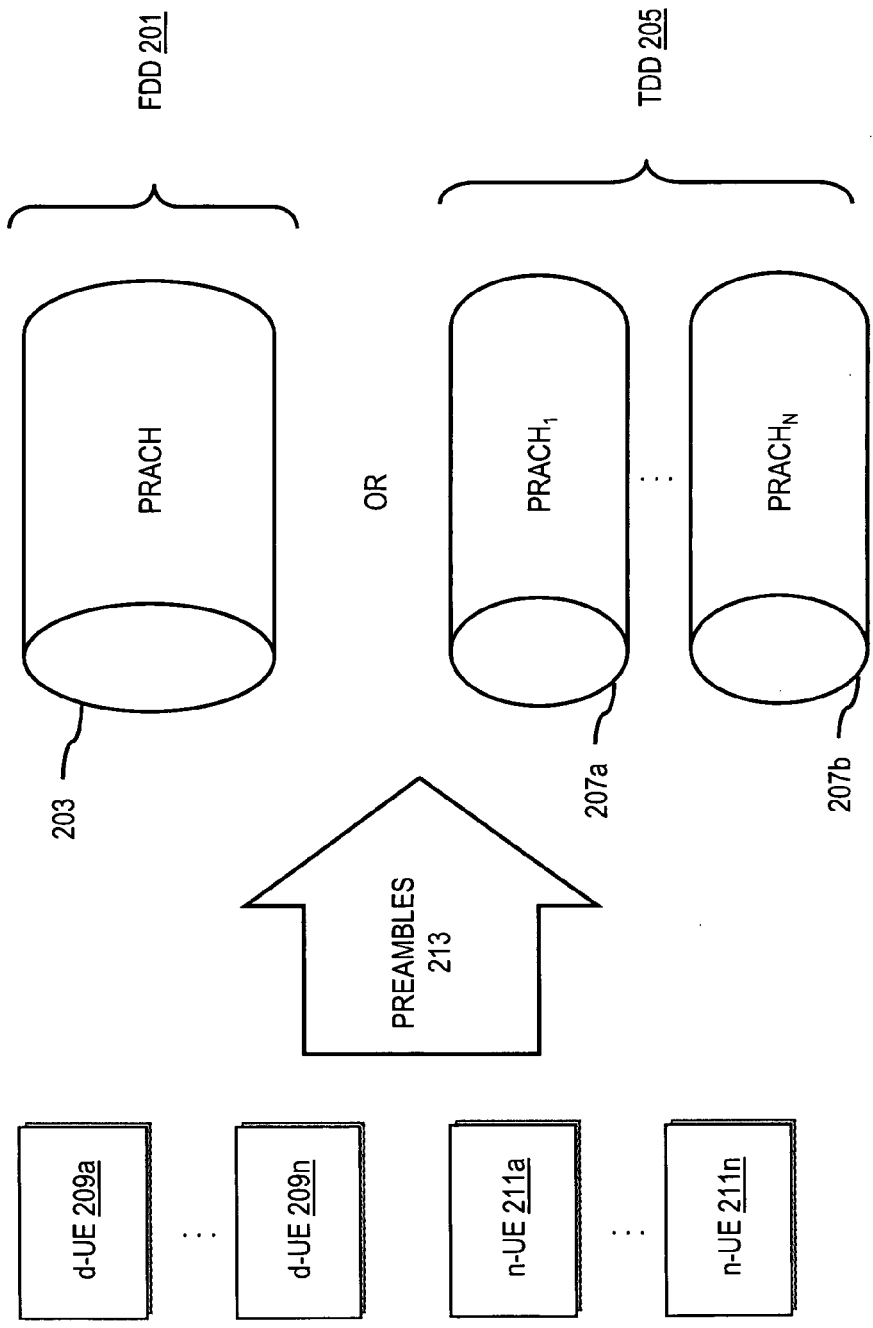
FIG. 2 is a diagram of physical random access channels (PRACHs) employed in a Time Division Duplex (TDD) and Frequency Division Duplex (FDD) transmission schemes, according to various exemplary embodiments.

FIG. 2 is a diagram of physical random access channels (PRACHs) employed in a Time Division Duplex (TDD) and Frequency Division Duplexing (FDD) transmission schemes, according to various exemplary embodiments. As shown, it should be noted that in FDD 201 (according to one embodiment), there is at most one PRACH 203 in each radio subframe. However, in another embodiment, with TDD 205, multiple PRACHs 207a-207n can be supported (e.g., six). PRACH 207 configuration under TDD 205 is described in more detailed in R1-081691 "TDD RACH Configurations" ZTE, RAN1#52b, Shenzhen and 3GPP TS 36.211 v8.2.0 (which are incorporated herein by reference in their entireties). By way of example, in the case of FDD 201 where all the UEs 101 (e.g., d-UEs 209a-209n and n-UEs 211a-211n) transmit RA preambles 213 in the same PRACH 203 are explained in the above references. Also, the references can be extended to the case of TDD 205 where the UEs 101 can transmit preambles 213 in different PRACHs 207a-207b. In one embodiment, the preambles 213 include one or more d-preambles, one or more s-preambles, one or more n-preambles, or a combination thereof. Additionally, in TDD, where the preambles 213 and corresponding PRACH are both selective in one subframe, the "soft-dedicated" approach can be extended to PRACH when a certain number of the preambles and corresponding random access channels are shared by both the d-UEs 209 and n-UEs 211.

Figure 3:
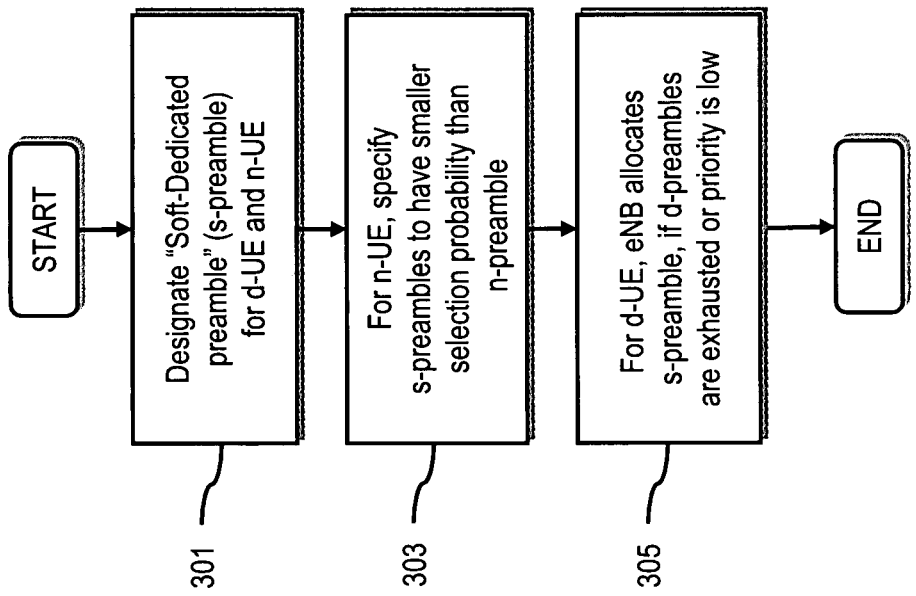
FIGS. 3-5 are flowcharts of processes for utilizing soft-dedicated preambles, according to various exemplary embodiments.
Figure 4:
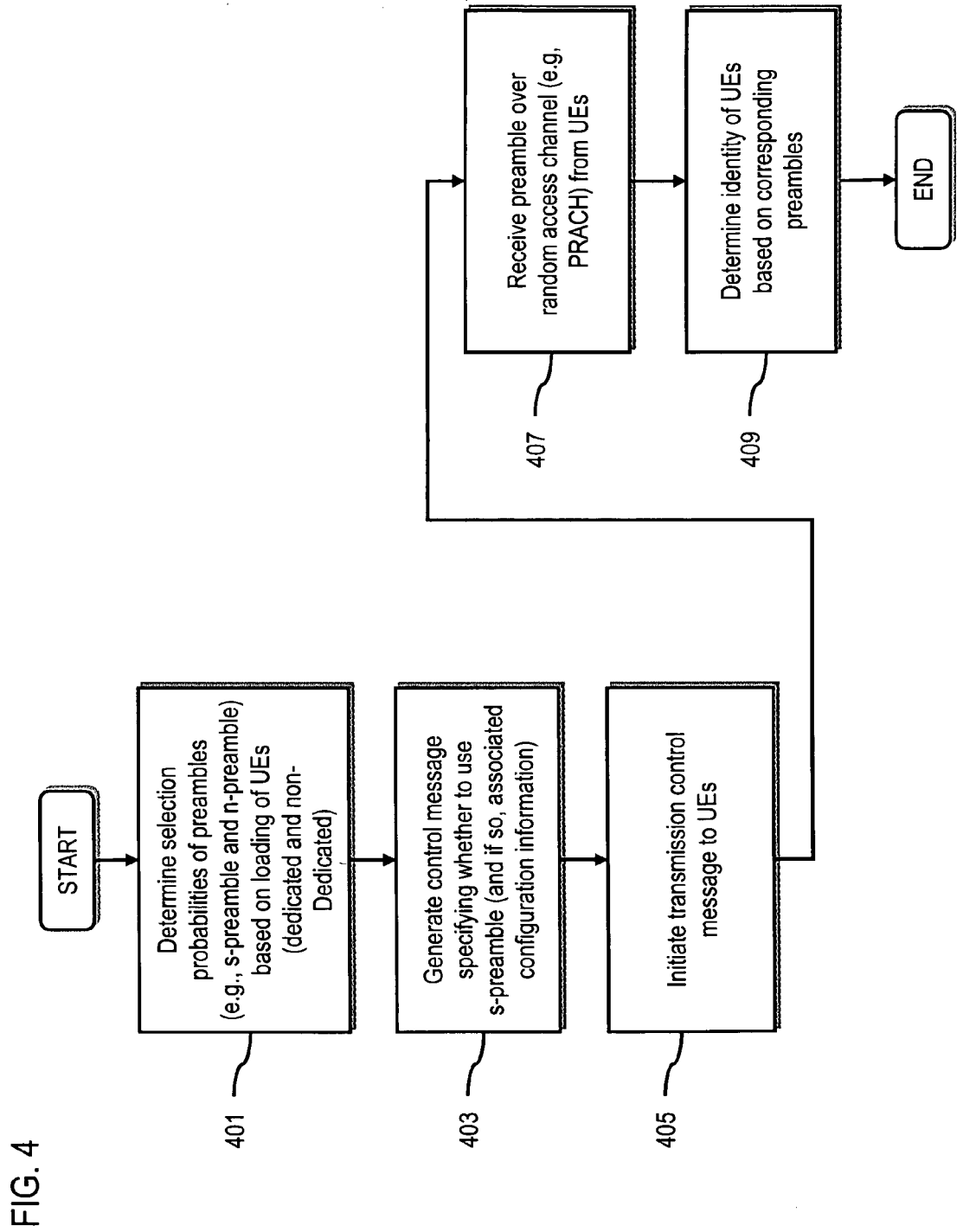
Figure 5:
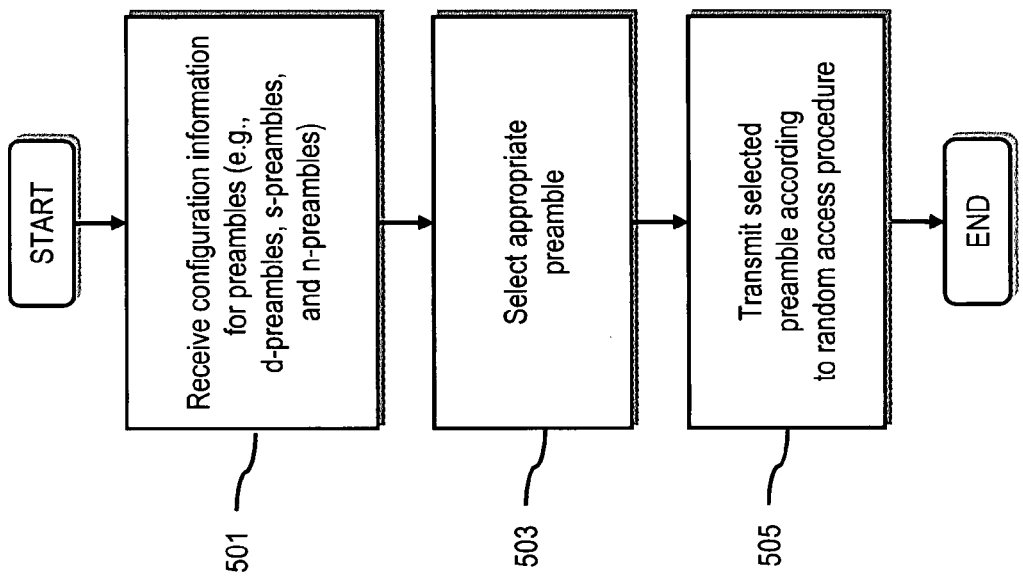

FIGS. 3-5 are flowcharts of processes for utilizing soft-dedicated preambles, according to various exemplary embodiments. It is noted that in an exemplary preamble allocation scheme, d-UE 209 and n-UE 211 have different views of the preamble 213 resource. In the view of the n-UE 211, all the preambles are associated with a "selection probability," which represents the chance or likelihood of selecting a particular preamble 213. Assuming the number of n-preambles is $N_n$, then the selection probabilities of n-preamble and d-preamble are listed in Table 1.

TABLE 1

|  | d-preamble | n-preamble |
| --- | --- | --- |
| d-UE 209 | according to the sequence | 0 unless to be changed to n-UE |
| n-UE 211 | 0 | $1/N_n$ for each one |

Under this scheme, a bit value of 0 can be used to indicate that the d-preambles and n-preambles are "hard" allocated to d-UE 209 and n-UE 211, respectively, i.e., no overlapping between their selections. By contrast, the processes of FIGS. 3-5, can, for some preambles 213, use selection probabilities that can be "softer" or more flexible—i.e., they can be available for both d-UE and n-UE but with different mechanisms (sequences or probabilities).

Although the processes of FIGS. 3-5 are described with respect to the random access procedure module 113 of the eNB 103, it is contemplated that the processes may be performed by the random access procedure module 115 of the UE 101 or other equivalent component in the system 100.

FIG. 3 is a flowchart of a process for designating a soft-dedicated preamble, according to one embodiment. In step 301, the random access procedure module 113, for instance, designates one of a plurality of preambles, associated with one or more random access channels, as a soft-dedicated preamble. In one embodiment, a certain number of preambles are defined as "soft-dedicated preamble (s-preamble)", which can be available for both d-UE 209 and n-UE 211. For n-UE 211, the random access procedure module 113 assigns a lower selection probability to the designated soft-dedicated preambles than assigned to the n-preambles (step 303). In this way, as discussed previously the severity of contention for the s-preambles is decreased. For d-UE 209, the random access procedure module 113 directs use of the soft-dedicated preambles only if d-preambles have been exhausted (step 305). In one embodiment, the s-preambles are then used according to a sequence, e.g., by their indexes. Table 2 below lists the relative selection probabilities resulting from these two rules.

TABLE 2

|  | d-preamble | s-preamble | n-preamble |
| --- | --- | --- | --- |
| d-UE | according to the sequence (high priority) | according to the sequence (low priority) | 0 unless to be changed to n-UE |
| n-UE | 0 | small probability | large probability |

As described, both d-UE 209 and n-UE 211 are influenced by the introduction of s-preambles. With respect to d-UE 209, s-preambles have smaller selection probabilities with respect to n-UEs 211, so the contention for s-preambles between d-UEs 209 and n-UEs 211 would be less severe compared to n-preamble. As a result, d-UEs 209 for which a corresponding d-preamble is not available would benefit from the s-preamble because there would be less chance of a collision from using the s-preamble than from defaulting to the n-preamble. Under the soft-dedicated approach, the d-UE 209 would in fact have three preamble options, each with a varying degrees of contention severity, e.g., d-preamble (no contention), s-preamble (low contention severity), and n-preamble (highest contention severity).

With respect to the n-UE 211, in general, two groups of preambles (e.g., s-preambles and n-preambles) are available for n-UE, with different selection probabilities. In one exemplary embodiment, the group of s-preambles has less selection probability and hence smaller contention severity. If the s-preambles are designated partially from d-preamble group, the total number of available preambles 213 increases for n-UE 211. The decreased contention severity also can potentially improve RA performance.

FIG. 4 illustrates a process for generating a control message for indicating use of s-preambles. In step 401, the random access procedure module 113 determines the selection probabilities of the preambles based on, in an exemplary embodiment, loading of the UEs 101. As discussed previously, the selection probability determines the likelihood that a particular preamble 213 will be selected for use. Accordingly, modifying the selection probability of a preamble 213 can vary the level of contention for the preamble 213. The discussion with respect to FIG. 6 describes the step of determining the selection probabilities in more detail. After generating the selection probabilities, the random access procedure module 113 generates a control message specifying configuration information for the preambles 213 (step 403). The configuration information in the control message includes the type (e.g., s-preamble, n-preamble, or d-preamble), size, and selection probabilities of the respective preambles 213. By way of example, the configuration information may direct a UE 101 to use an s-preamble for transmission over the random access channel. It is also contemplated that the configuration message may also contain other parameters such as expiration time and the like. The random access procedure module 113 then initiates transmission of the control message to the UEs 101 (step 405). In return, the random access procedure module 113 receives a preamble over the corresponding random access channel (e.g., PRACH) from the UE 101 (step 407). The module 113 can also determine the identity of the UE 101s based on, for instance, information in the received preambles (step 409).

FIG. 5 is a flowchart of a process for receiving configuration information, according to one embodiment. In step 501, the random access procedure module 115 of the UE 101 receives preamble configuration information from, for instance, the eNB 103. For example, the preamble configuration information specifies what type of preamble 213 (e.g., s-preamble, n-preamble, or d-preamble) the UE 101 is to use for transmission according to the RA procedure. As discussed above, the configuration information also includes parameters (e.g., size and selection probability) for the UE 101 to use in selecting and configuring the preamble 213. In one example, the configuration information specifies the use of an s-preamble and associated selection probability. Accordingly, the random access procedure module 115 selects the appropriate preamble based on the configuration information (step 503) and initiates transmission of the selected preamble to, for instance, the eNB 103 according to the RA procedure (505). In one embodiment, the preamble transmission includes information to identify the transmitting UE 101. Additionally, the transmission may be conducted using a random access channel that is established according to either a TDD or an FDD scheme.

Figure 6:
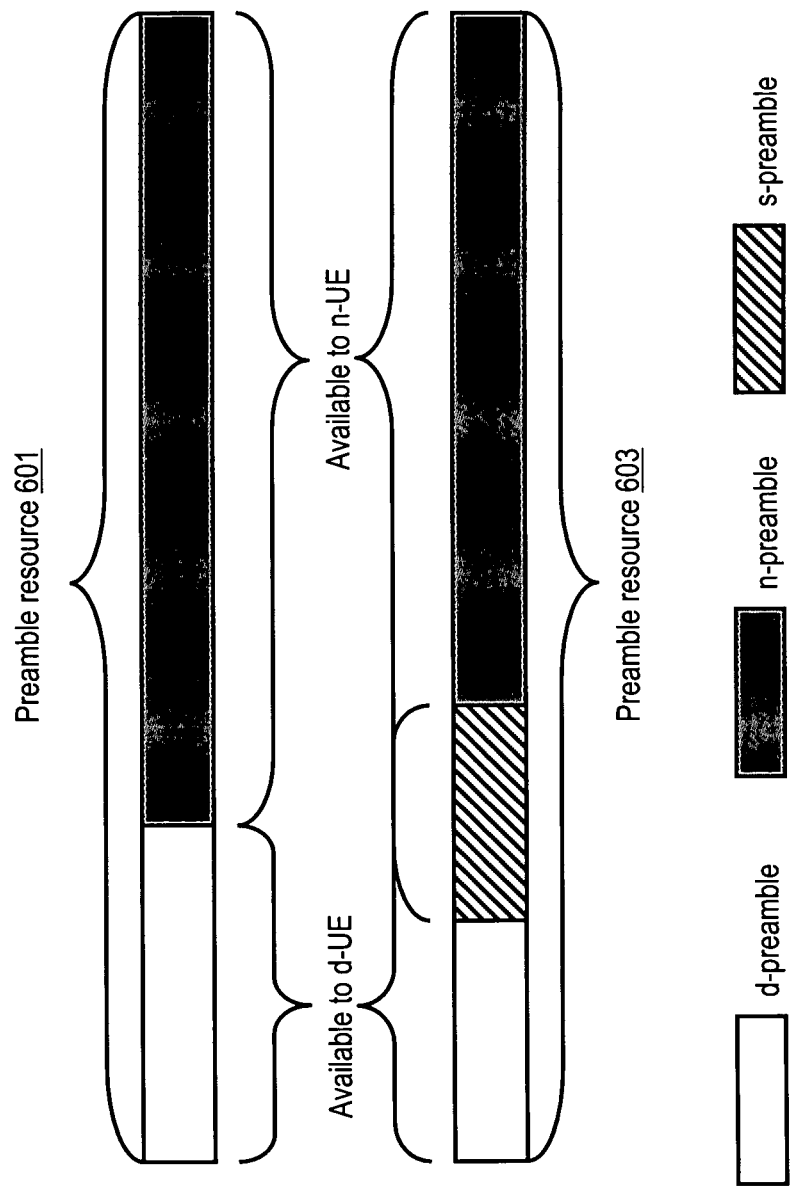
FIG. 6 is a diagram of an exemplary format of a soft-dedicated preamble, according to an exemplary embodiment.

FIG. 6 is a diagram of an exemplary format of a soft-dedicated preamble, according to an exemplary embodiment. In one embodiment, the configuration information associated with s-preambles and n-preambles, including their sizes and selection probabilities, are broadcasted to all the n-UE 211 within, for instance, the cell corresponding to the eNB 103. For example, FIG. 6 depicts a preamble resource 601 with a fixed preamble split including only d-preambles and n-preambles. In this case, the number of d-preambles is fixed and available only for use by the d-UEs 209. If not enough d-preambles are available to satisfy all d-UEs 209, one or more of the extra d-UEs 209 are effectively converted to n-UEs 209 and must contend for available n-preambles.

On the other hand, as depicted, preamble resource 603 uses the soft-dedicated preamble approach by designation a portion of the available preambles a s-preambles that can be used by either the d-UEs 209 or the n-UEs 211. In this case, the preamble resource 603 consists of a number of d-preambles, a number of s-preambles, and a number of n-preambles. Depending on preamble usage by d-UEs 209 and the n-UEs 211, the preamble resource 603 retains the flexibility of using the s-preambles to support the resource needs of either the d-UEs 209 or the n-UEs 211. For example, if there are not sufficient d-preamble resources to satisfy the needs of all d-UEs 209, the d-UE 209 can use the s-preambles before having to convert to using n-preambles. Similarly, if the contention among n-UEs 211 for available n-preambles is severe, s-preambles can be used to lessen the contention.

In one embodiment, the configuration information includes a single bit to indicate whether to employ an s-preamble with fixed preamble splits. In other words, the single bit directs the UE 101 to either use the preamble resource 601 with no s-preambles or the preamble resource 603 with s-preambles. Additionally, the selection probabilities of s-preambles and n-preambles can be configured according to the load situation of the d-UE 209 and n-UEs 211. By way of example, for each s-preamble, no-collision happens when: (1) the s-preamble has been allocated to a d-UE 209, and no n-UE 211 selects the s-preamble for use; or (2) only one n-UE 211 selects to use the s-preamble and the s-preamble has not been allocated to any d-UE 209.

To illustrate the above approach, two cases involving high loading (i.e., 20 and 30 n-UE) and low loading (i.e., no more than 10 n-UE) are described.

In the high load case, it is assumed that a total of 64 preamble resource exists; e.g., 8 d-preambles and 56 n-preambles. It is noted that there are often more than 8 d-UE in one cell. Accordingly, the following three schemes are address this:

Scheme 1: 8 d-preambles and 56 n-preambles. In this case, the extra d-UEs 209 (whose index is beyond 8) should be considered to be n-UEs 211 and join in the contention of n-preambles.

Scheme 2: 16 d-preambles and 48 n-preambles. That is, 8 n-preambles are changed into d-preambles.

Scheme 3: 8 d-preambles, 8 s-preambles and 48 n-preambles. That is, 8 n-preambles are changed into s-preambles.

Accordingly, the "RA success ratio" can be computed; this ratio indicates that for one UE 101, whether d-UE 209 or n-UE 211, its probability of success in the contention of preamble resource. That is, this UE 101 selects a preamble that is not selected by any other UE 101. For Scheme 1, each n-UE 211 equally selected a n-preamble, i.e., $$\frac{1}{56}$$

probability to select any n-preamble. If the number of d-UEs 209 is not more than 8, RA success ratio for a d-UE 209 is 1, and RA success ratio for an n-UE 211 equals $$\left(\frac{55}{56}\right)^{M_n-1},$$

where $M_n$ denotes the number of n-UEs 211. Otherwise, if the number of d-UEs 209 is more than 8, the extra d-UEs 209 and n-UEs 211 both have the RA success ratio $$\left(\frac{55}{56}\right)^{M_n-1+M'},$$

where M' denotes the number of extra d-UEs 209 beyond the number of d-preambles.

For Scheme 2, the analysis is similar to Scheme 1, except the threshold is 16 d-UE. That is, if the number of d-UEs 209 is not more than 16, the RA success ratio of each n-UE 211 is $$\left(\frac{47}{48}\right)^{M_n-1}.$$

For Scheme 3, each n-UE 211 has $$\frac{1}{52}$$

probability to select an n-preamble, and $$\frac{1}{104}$$

probability to select an s-preamble. So the RA success ratio for a d-UE 209 is 1 for the first 8 d-UEs 209, and $$\left(\frac{103}{104}\right)^{M_n}$$

for the next 8 d-UEs 209.

For n-UEs 211, the non-contention probability for any n-preamble is $$\left(\frac{51}{52}\right)^{M_n-1},$$

the non-contention probability for any s-preamble is $$\left(\frac{103}{104}\right)^{M_n-1}.$$

So the RA success ratio equals $$\left(\frac{51}{52}\right)^{M_n-1} \cdot \frac{48}{52} + \left(\frac{103}{104}\right)^{M_n-1} \cdot \frac{8-M'}{104}.$$

Turning now to the low load case, when no more than 10 n-UEs 211 join in the contention-based RA, the RA success ratio for an n-UE 211 would not change much with any scheme since the number of n-UEs 211 is too small relative to the number of n-preambles. However, in this case, for the extra d-UEs 209, the s-preambles still provide much smaller collision probability than n-preambles.

The s-preamble design, according to certain embodiments, has the following advantages. For example, the approach provides a group of preambles for d-UEs 209 with medium RA success ratio, which can be used to protect the extra d-UEs 209 from serious decrease of RA performance and increase the system flexibility. Also, a larger amount of available preambles are provided for both d-UEs 209 and n-UEs 211; thus, system robustness is improved in terms of the variation of the number of d-UEs 209. The approach can also dynamically adjust the split of preamble groups (e.g., relative numbers of s-preambles, n-preambles, and d-preambles), thereby reducing system overhead.

In addition to having a balanced RA performance for both d-UEs 209 and n-UEs 211, the design of s-preambles can address the following scenarios:

For a d-UE 209 with a dedicated preamble, if the d-UE 209 cannot successfully access the d-preamble before, for instance, expiration of a corresponding timer, the d-UE 209 can be allocated with an s-preamble instead of an n-preamble to avoid degradation of RA performance (e.g., decrease in RA success ratio). This scenario fits well in the present LTE MAC specification. A UE 101 that is attempting a handover is normally allocated with a d-preamble. If a validity time (controlled by the expiration timer) has been given for the preamble in the handover command, the UE 101 continues with a contention based procedure if the d-preamble expires. It could be specified that in this case, the UE 101 should use an s-preamble instead in the contention based procedure. In this way, the probability of a delay due to lost contention would be minimized.

For a group of d-UEs 209 that wants to handover into the same target cell in which there is not enough d-preambles, a portion of the group can be allocated with s-preambles instead of n-preambles to improve the handover success ratio;

For a group of d-UEs 209 that have downlink data transfer requirements where there are not enough d-preambles, those d-UEs 209 with loose timing requirements can be allocated with s-preambles.

Figure 7:
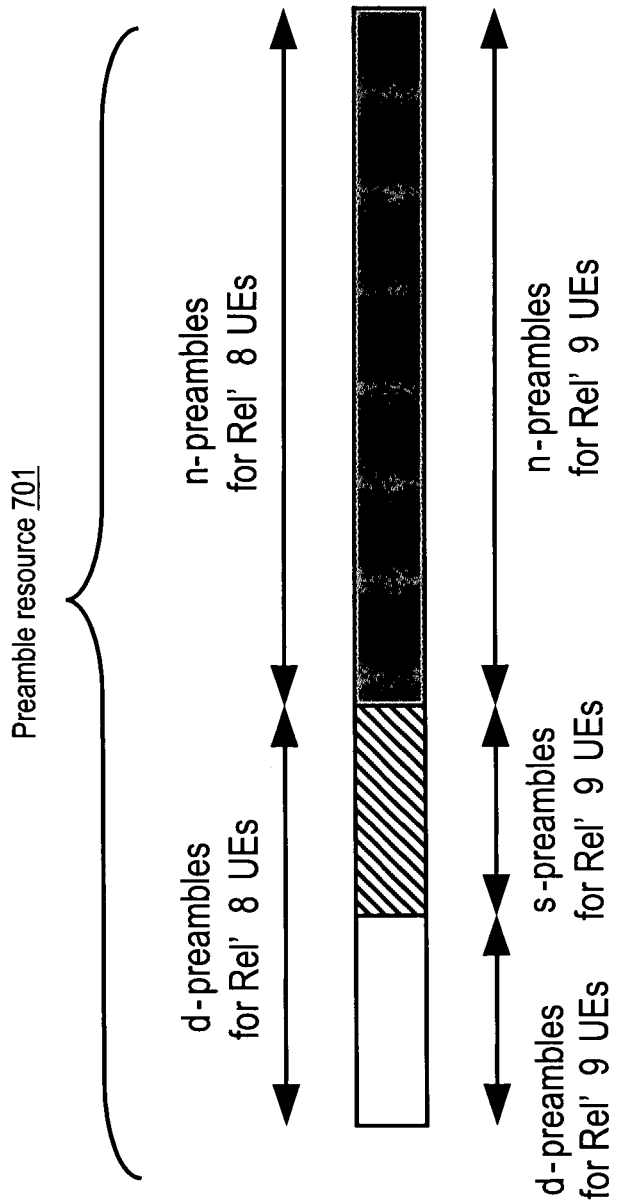
FIG. 7 is a diagram of an exemplary format of a soft-dedicated preamble deployed in different versions of a standard, according to an exemplary embodiment.

FIG. 7 is a diagram of an exemplary format of a soft-dedicated preamble deployed in different versions of a standard, according to an exemplary embodiment. In a system implementing Long Term Evolution (LTE) Release 8 (Rel'8), the approach described herein can be implemented in LTE Release 9 (Rel'9) on top of the existing Rel'8 system by just adding one parameter to the system information. This parameter would indicate, to the Rel'9 UEs 101, how many s-preambles exist. Rel'9 UEs would then view the d-, s-, and n-preambles, while for Rel'8 UEs the d- and s-preambles would form their group of d-preambles, as shown in FIG. 7. For example, the preamble resource 701 is divided among d-preambles and n-preambles from the perspective of a Rel'8 UE 101 for which the added parameter has no meaning. However, for the Rel'9 UEs 101 that can interpret the parameter, the preamble resource 701 would be divided into d-preambles, s-preambles, and n-preambles. As shown, the Rel'9 s-preambles appear as d-preambles to Rel'8 UEs 101. In other embodiments, it is contemplated that the Rel'9 s-preambles can appear as n-preambles to Rel'8 UEs 101. The former approach (as shown) would be important when the numbers of Rel'8 and 9 UEs 101 are comparable: Rel'9 UEs 101 would fully benefit from the invented system while Rel'8 UEs 101 would not be affected.

The latter approach (as contemplated) becomes particularly useful if it can be expected that the number of Rel'8 UEs 101 is small compared with Rel'9 UEs 101 because then the probability that a Rel'8 UE 101 will transmit an s-preamble could be small.

In certain embodiments, the processes described above can be performed within an UMTS terrestrial radio access network (UTRAN) or Evolved UTRAN (E-UTRAN) in 3GPP, as next described.

FIGS. 8A-8D are diagrams of communication systems having exemplary long-term evolution (LTE) architectures, in which the user equipment (UE) and the base station of FIG. 1 can operate, according to various exemplary embodiments of the invention. By way of example (shown in FIG. 8A), a base station (e.g., destination node) and a user equipment (UE) (e.g., source node) can communicate in system 800 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 8A:
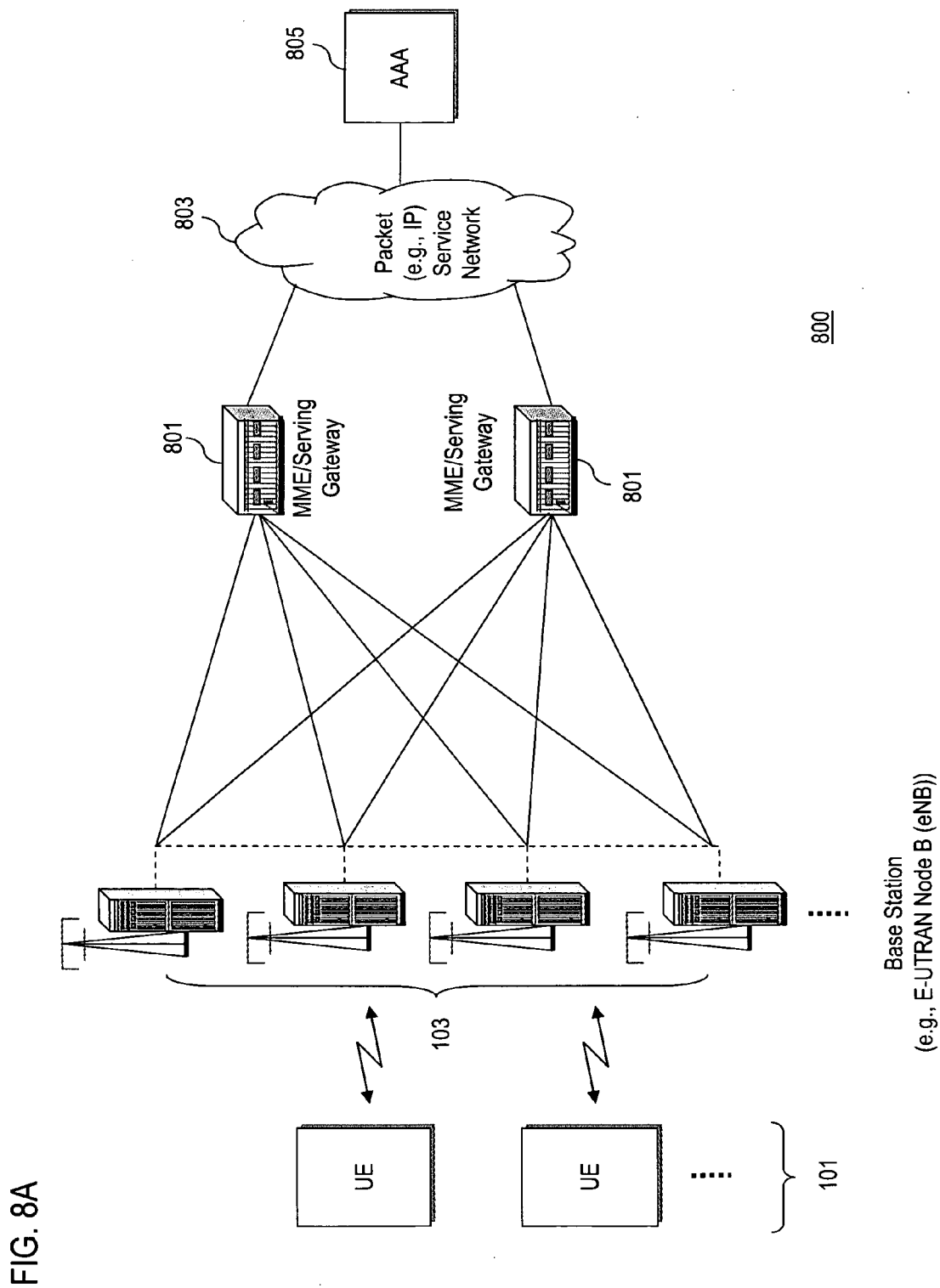
FIGS. 8A-8D are diagrams of communication systems having exemplary long-term evolution (LTE) and E-UTRA (Evolved Universal Terrestrial Radio Access) architectures, in which the system of FIG. 1 can operate to provide resource allocation, according to various exemplary embodiments of the invention.

The communication system 800 is compliant with 3GPP LTE, entitled "Long Term Evolution of the 3GPP Radio Technology" (which is incorporated herein by reference in its entirety). As shown in FIG. 8A, one or more user equipment (UEs) communicate with a network equipment, such as a base station 83, which is part of an access network (e.g., WiMAX (Worldwide Interoperability for Microwave Access), 3GPP LTE (or E-UTRAN), etc.). Under the 3GPP LTE architecture, base station 83 is denoted as an enhanced Node B (eNB).

MME (Mobile Management Entity)/Serving Gateways 801 are connected to the eNBs 83 in a full or partial mesh configuration using tunneling over a packet transport network (e.g., Internet Protocol (IP) network) 803. Exemplary functions of the MME/Serving GW 801 include distribution of paging messages to the eNBs 83, termination of U-plane packets for paging reasons, and switching of U-plane for support of UE mobility. Since the GWs 801 serve as a gateway to external networks, e.g., the Internet or private networks 803, the GWs 801 include an Access, Authorization and Accounting system (AAA) 805 to securely determine the identity and privileges of a user and to track each user's activities. Namely, the MME Serving Gateway 801 is the key control-node for the LTE access-network and is responsible for idle mode UE tracking and paging procedure including retransmissions. Also, the MME 801 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 8B:
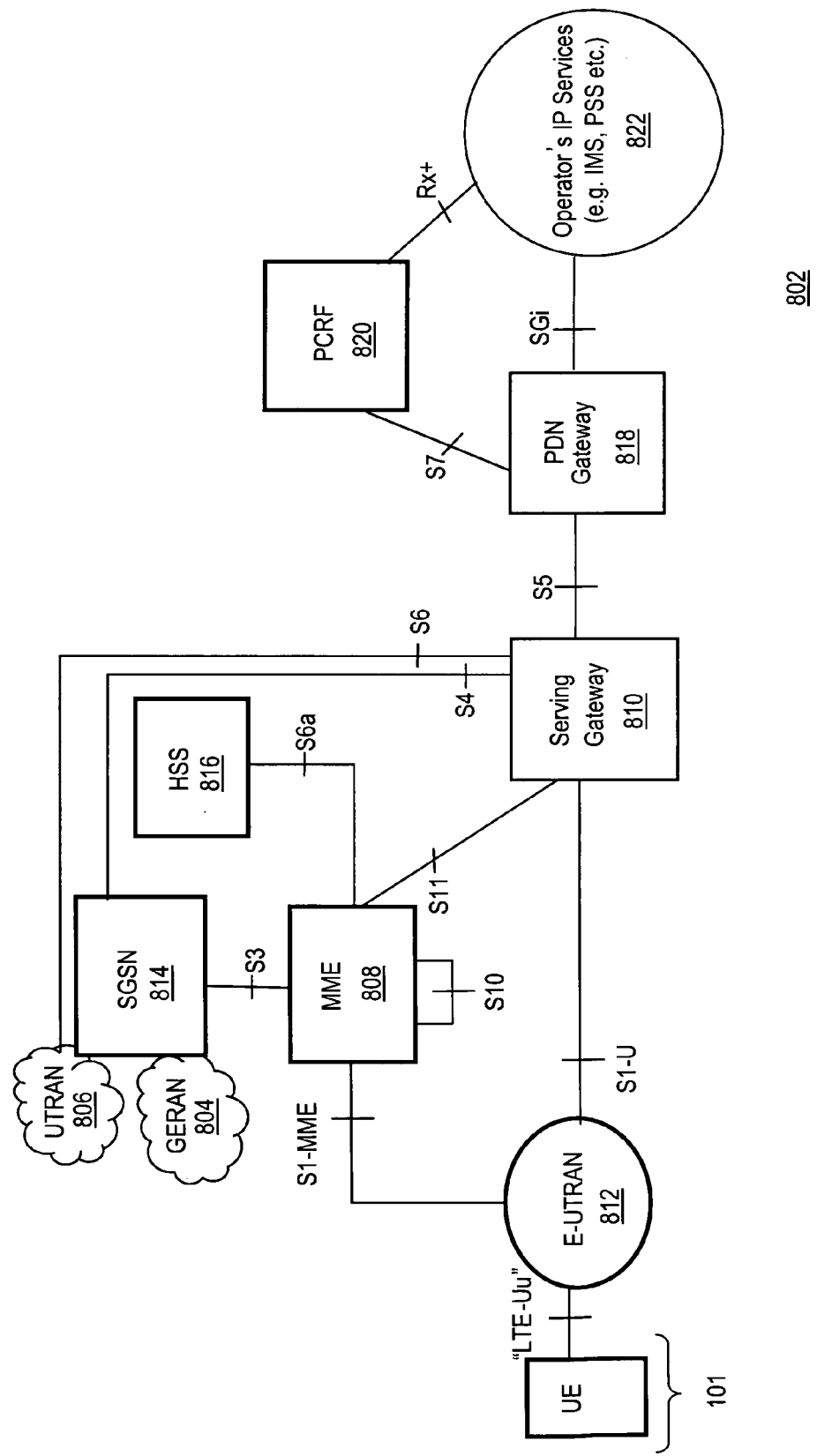

In FIG. 8B, a communication system 802 supports GERAN (GSM/EDGE radio access) 804, and UTRAN 806 based access networks, E-UTRAN 812 and non-3GPP (not shown) based access networks, and is more fully described in TR 23.882, which is incorporated herein by reference in its entirety. A key feature of this system is the separation of the network entity that performs control-plane functionality (MME 808) from the network entity that performs bearer-plane functionality (Serving Gateway 810) with a well defined open interface between them S11. Since E-UTRAN 812 provides higher bandwidths to enable new services as well as to improve existing ones, separation of MME 808 from Serving Gateway 810 implies that Serving Gateway 810 can be based on a platform optimized for signaling transactions. This scheme enables selection of more cost-effective platforms for, as well as independent scaling of, each of these two elements. Service providers can also select optimized topological locations of Serving Gateways 810 within the network independent of the locations of MMEs 808 in order to reduce optimized bandwidth latencies and avoid concentrated points of failure.

As seen in FIG. 8B, the E-UTRAN (e.g., eNB) 812 interfaces with UE 81 via LTE-Uu. The E-UTRAN 812 supports LTE air interface and includes functions for radio resource control (RRC) functionality corresponding to the control plane MME 808. The E-UTRAN 812 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 808, as a key control node, is responsible for managing mobility UE identifies and security parameters and paging procedure including retransmissions. The MME 808 is involved in the bearer activation/deactivation process and is also responsible for choosing Serving Gateway 810 for the UE 81. MME 808 functions include Non Access Stratum (NAS) signaling and related security. MME 808 checks the authorization of the UE 81 to camp on the service provider's Public Land Mobile Network (PLMN) and enforces UE 81 roaming restrictions. The MME 808 also provides the control plane function for mobility between LTE and 2G/3G access networks with the S3 interface terminating at the MME 808 from the SGSN (Serving GPRS Support Node) 814.

The SGSN 814 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 808 and HSS (Home Subscriber Server) 816. The S10 interface between MMEs 808 provides MME relocation and MME 808 to MME 808 information transfer. The Serving Gateway 810 is the node that terminates the interface towards the E-UTRAN 812 via S1-U.

The S1-U interface provides a per bearer user plane tunneling between the E-UTRAN 812 and Serving Gateway 810. It contains support for path switching during handover between eNBs 83. The S4 interface provides the user plane with related control and mobility support between SGSN 814 and the 3GPP Anchor function of Serving Gateway 810.

The S12 is an interface between UTRAN 806 and Serving Gateway 810. Packet Data Network (PDN) Gateway 818 provides connectivity to the UE 81 to external packet data networks by being the point of exit and entry of traffic for the UE 81. The PDN Gateway 818 performs policy enforcement, packet filtering for each user, charging support, lawful interception and packet screening. Another role of the PDN Gateway 818 is to act as the anchor for mobility between 3GPP and non-3GPP technologies such as WiMax and 3GPP2 (CDMA 1x and EvDO (Evolution Data Only)).

The S7 interface provides transfer of QoS policy and charging rules from PCRF (Policy and Charging Role Function) 820 to Policy and Charging Enforcement Function (PCEF) in the PDN Gateway 818. The SGi interface is the interface between the PDN Gateway and the operator's IP services including packet data network 822. Packet data network 822 may be an operator external public or private packet data network or an intra operator packet data network, e.g., for provision of IMS (IP Multimedia Subsystem) services. Rx+ is the interface between the PCRF and the packet data network 822.

Figure 8C:
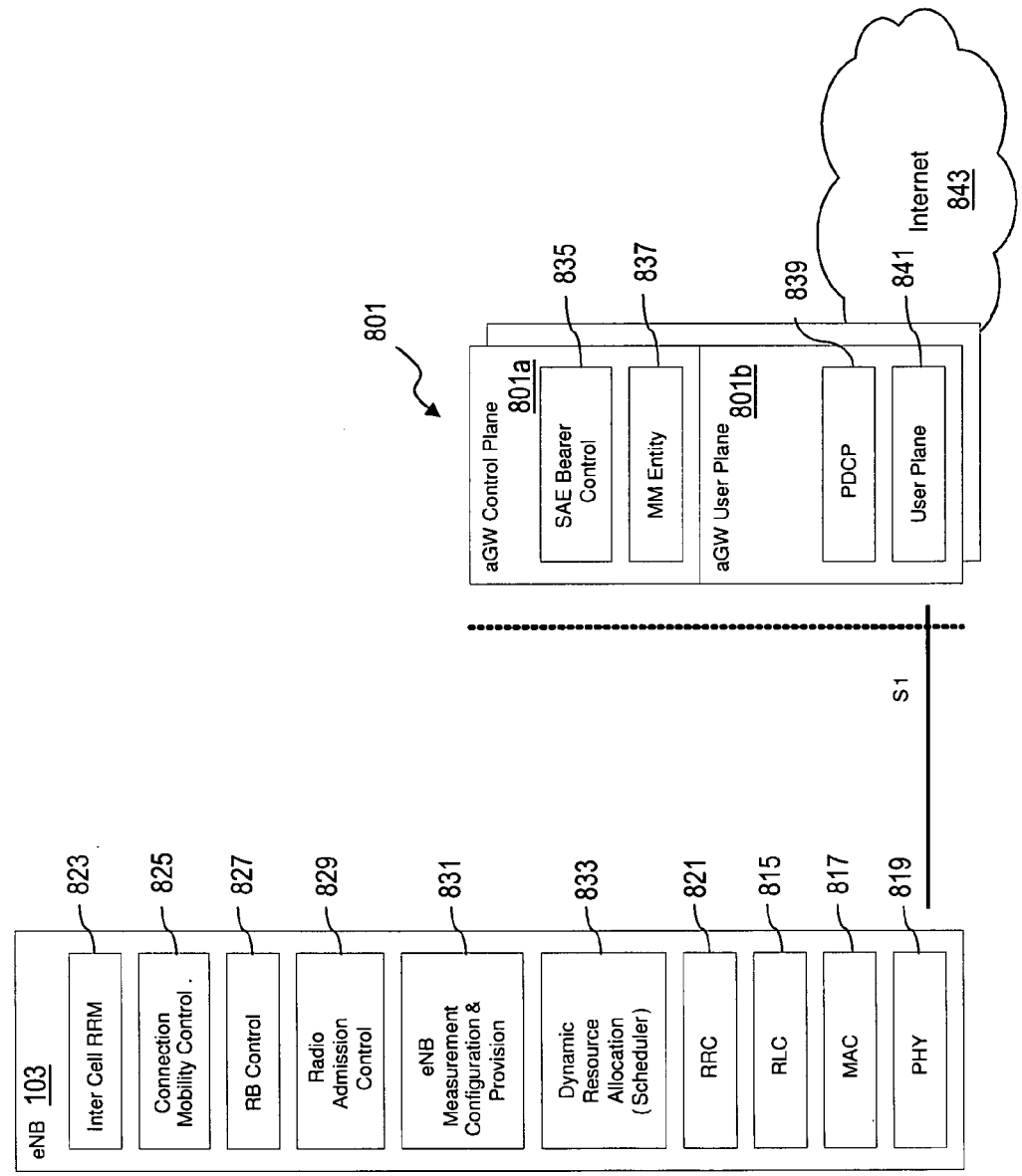

As seen in FIG. 8C, the eNB 83 utilizes an E-UTRA (Evolved Universal Terrestrial Radio Access) (user plane, e.g., RLC (Radio Link Control) 815, MAC (Media Access Control) 817, and PHY (Physical) 819, as well as a control plane (e.g., RRC 821)). The eNB 83 also includes the following functions: Inter Cell RRM (Radio Resource Management) 823, Connection Mobility Control 825, RB (Radio Bearer) Control 827, Radio Admission Control 829, eNB Measurement Configuration and Provision 831, and Dynamic Resource Allocation (Scheduler) 833.

The eNB 83 communicates with the aGW 801 (Access Gateway) via an S1 interface. The aGW 801 includes a User Plane 801a and a Control plane 801b. The control plane 801b provides the following components: SAE (System Architecture Evolution) Bearer Control 835 and MM (Mobile Management) Entity 837. The user plane 801b includes a PDCP (Packet Data Convergence Protocol) 839 and a user plane functions 841. It is noted that the functionality of the aGW 801 can also be provided by a combination of a serving gateway (SGW) and a packet data network (PDN) GW. The aGW 801 can also interface with a packet network, such as the Internet 843.

Figure 8D:
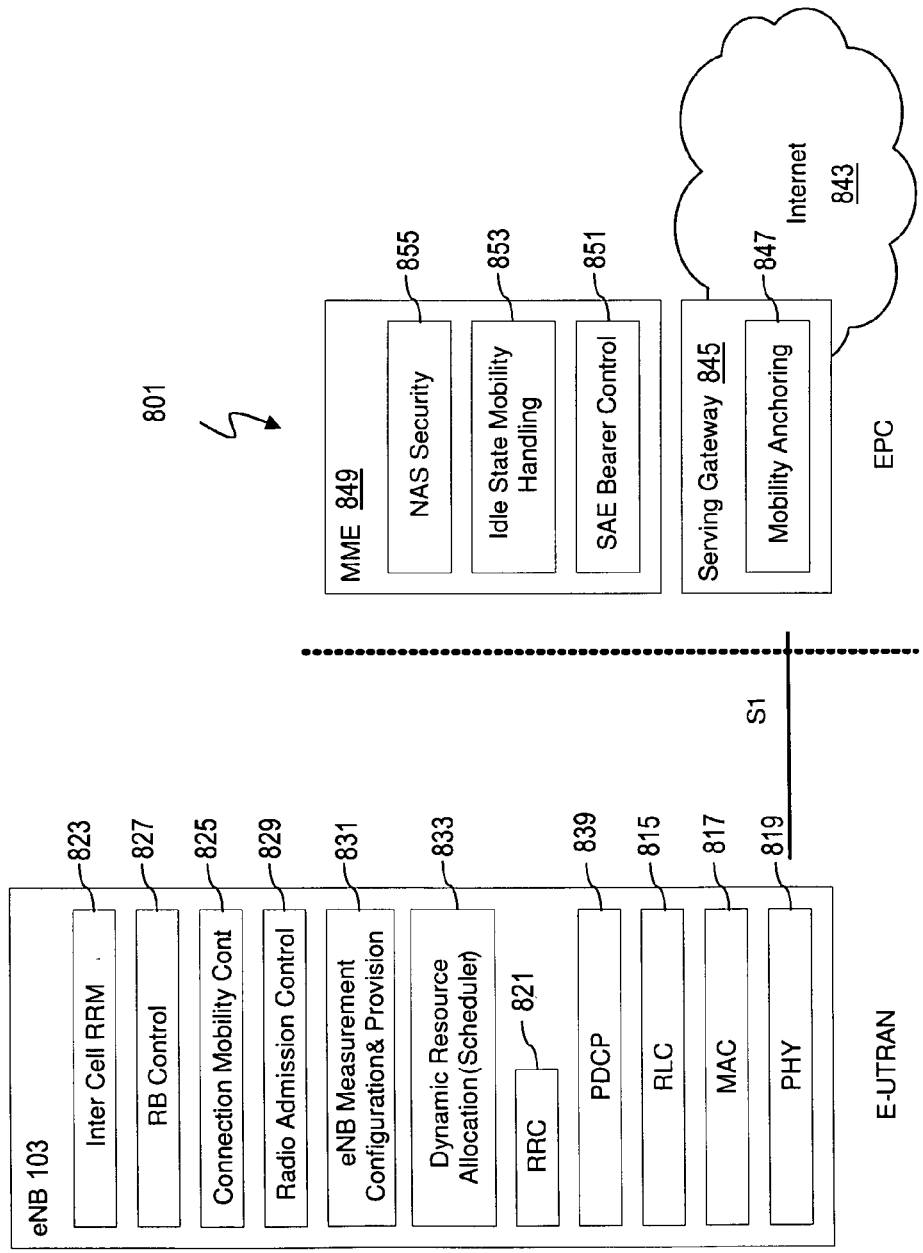

In an alternative embodiment, as shown in FIG. 8D, the PDCP (Packet Data Convergence Protocol) functionality can reside in the eNB 83 rather than the GW 801. Other than this PDCP capability, the eNB functions of FIG. 8C are also provided in this architecture.

In the system of FIG. 8D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 83 interfaces via the S1 to the Serving Gateway 845, which includes a Mobility Anchoring function 847.

According to this architecture, the MME (Mobility Management Entity) 849 provides SAE (System Architecture Evolution) Bearer Control 851, Idle State Mobility Handling 853, and NAS (Non-Access Stratum) Security 855.

One of ordinary skill in the art would recognize that the processes for performing random access procedure using soft-dedicated preambles may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 9:
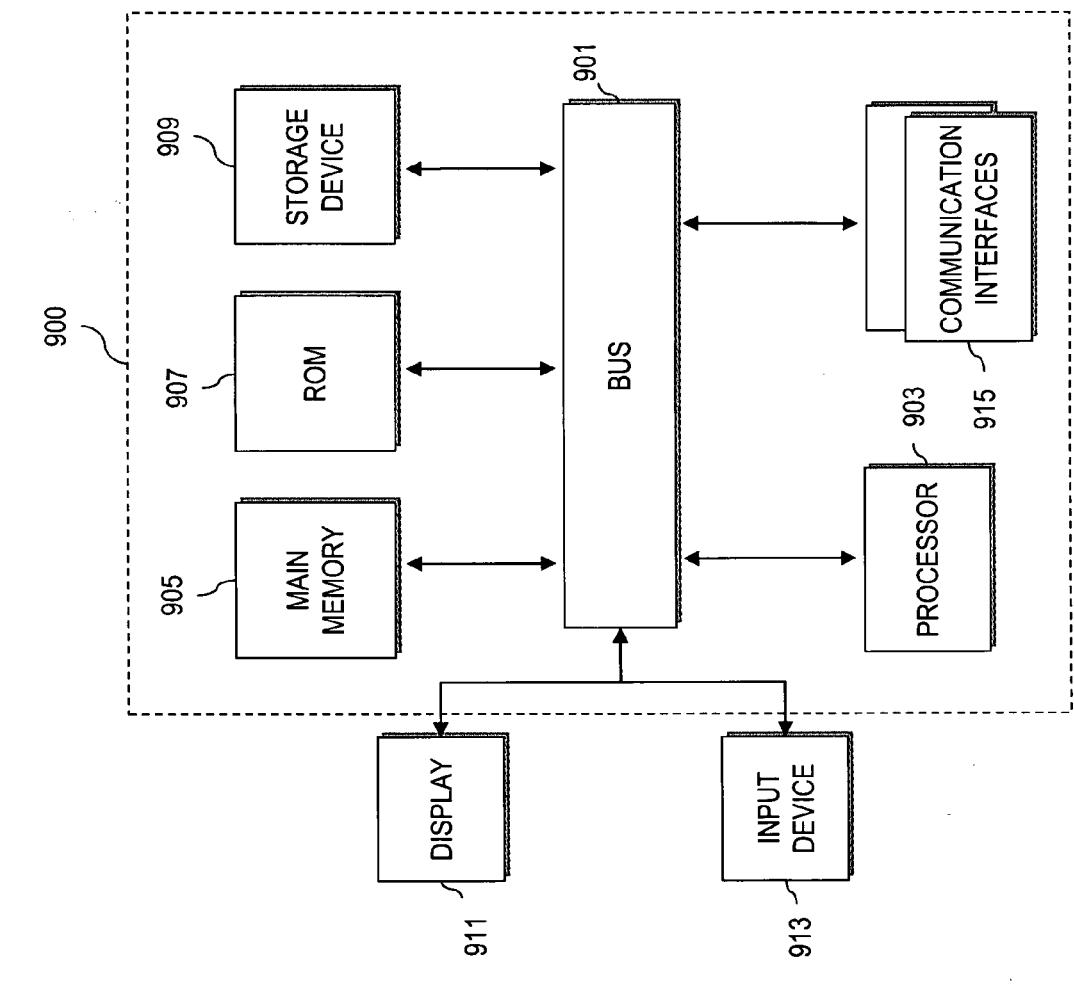
FIG. 9 is a diagram of hardware that can be used to implement an embodiment of the invention.

FIG. 9 illustrates exemplary hardware upon which various embodiments of the invention can be implemented. A computing system 900 includes a bus 901 or other communication mechanism for communicating information and a processor 903 coupled to the bus 901 for processing information. The computing system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computing system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computing system 900 may be coupled via the bus 901 to a display 911, such as a liquid crystal display, or active matrix display, for displaying information to a user. An input device 913, such as a keyboard including alphanumeric and other keys, may be coupled to the bus 901 for communicating information and command selections to the processor 903. The input device 913 can include a cursor control, such as a mouse, a trackball, or cursor direction keys, for communicating direction information and command selections to the processor 903 and for controlling cursor movement on the display 911.

According to various embodiments of the invention, the processes described herein can be provided by the computing system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 900 also includes at least one communication interface 915 coupled to bus 901. The communication interface 915 provides a two-way data communication coupling to a network link (not shown). The communication interface 915 sends and receives electrical, electromagnetic, or optical signals that carry digital data streams representing various types of information. Further, the communication interface 915 can include peripheral interface devices, such as a Universal Serial Bus (USB) interface, a PCMCIA (Personal Computer Memory Card International Association) interface, etc.

The processor 903 may execute the transmitted code while being received and/or store the code in the storage device 909, or other non-volatile storage for later execution. In this manner, the computing system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
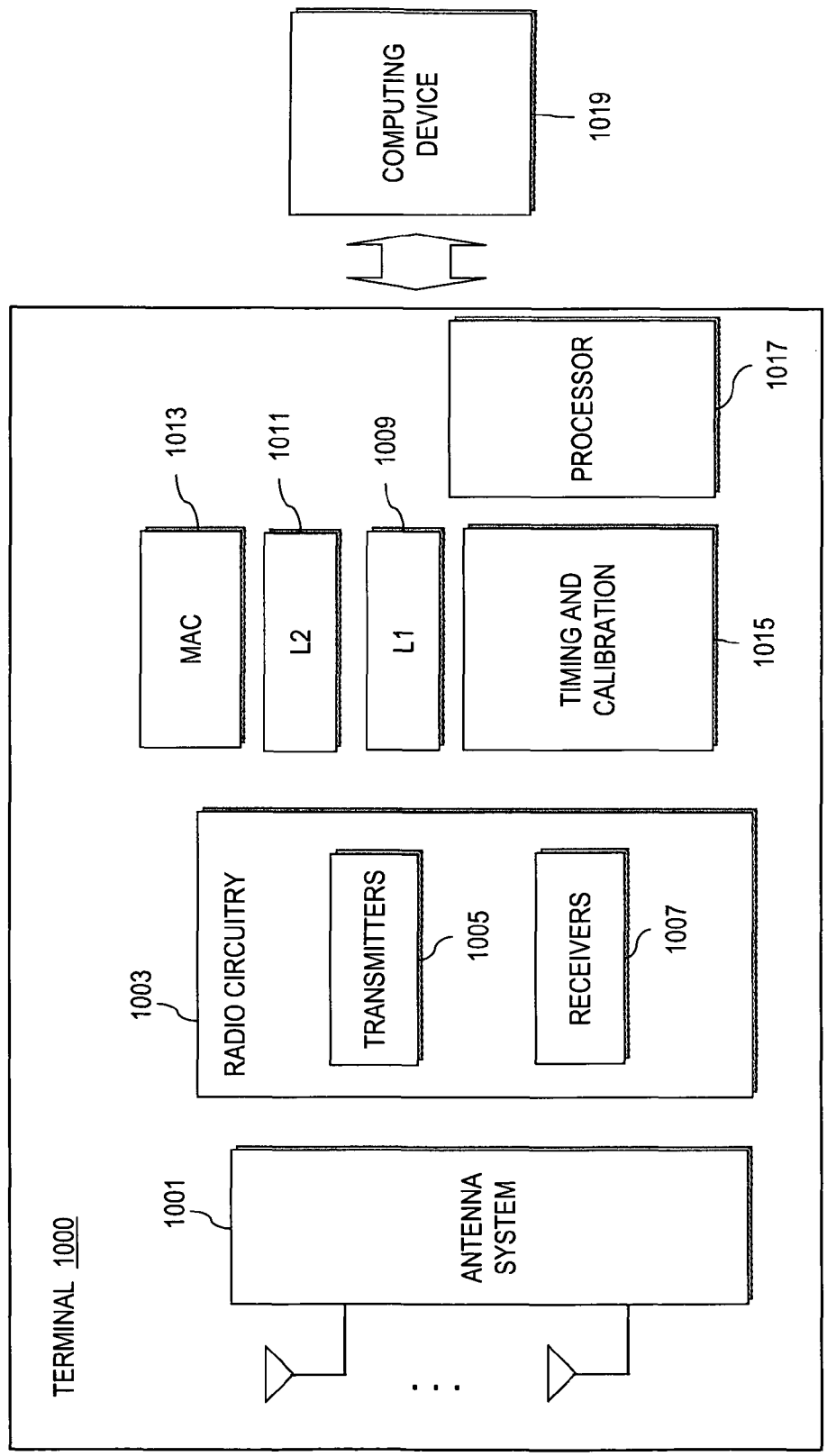
FIG. 10 is a diagram of exemplary components of a user terminal configured to operate in the systems of FIGS. 8A-8D, according to an embodiment of the invention.

FIG. 10 is a diagram of exemplary components of a user terminal configured to operate in the systems of FIGS. 8A-8D, according to an embodiment of the invention. A user terminal 1000 includes an antenna system 1001 (which can utilize multiple antennas) to receive and transmit signals. The antenna system 1001 is coupled to radio circuitry 1003, which includes multiple transmitters 1005 and receivers 1007. The radio circuitry encompasses all of the Radio Frequency (RF) circuitry as well as base-band processing circuitry. As shown, layer-1 (L1) and layer-2 (L2) processing are provided by units 1009 and 1011, respectively. Optionally, layer-3 functions can be provided (not shown). Module 1013 executes all Medium Access Control (MAC) layer functions. A timing and calibration module 1015 maintains proper timing by interfacing, for example, an external timing reference (not shown). Additionally, a processor 1017 is included. Under this scenario, the user terminal 1000 communicates with a computing device 1019, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the claims. Although features of the invention are expressed in certain combinations among the claims, it is contemplated that these features can be arranged in any combination and order.

We claim:

1. An apparatus comprising:
    at least one processor; and
    at least one memory including computer program code, the at least one memory and the computer program code configured, with the at least one processor, to cause the apparatus to perform at least the following:
    determine configuration information specifying at least one first contention-based preamble having a lower level of contention severity than at least one second contention-based preamble, the configuration information including an indication indicative of a selection probability of the at least one first contention-based preamble;
    attempt, when an non-contention-based random access attempt is selected, to select a non-contention-based preamble;
    transmit, depending on whether the attempt is successful, the access attempt with the non-contention-based preamble or a selected one of the at least one first contention-based preamble; and
    select the at least one first contention-based preamble with a lower selection probability than the at least one second contention-based preamble.

2. The apparatus according to claim 1, wherein the at least one memory and the computer program code are further configured, with the at least one processor, to cause the apparatus to perform at least the following:
    select, when a contention-based random access attempt is selected, a contention-based preamble from the at least one first contention-based preamble and the at least one second contention-based preamble substantially randomly such that the at least one first contention-based preamble is selectable according to the lower level of contention severity.

3. The apparatus according to claim 1, wherein the at least one memory and the computer program code are further configured, with the at least one processor, to cause the apparatus to perform at least the following:
    determine the configuration information from a signal received from a base station.

4. The apparatus according to claim 1, wherein the configuration information comprises an indication indicative of splitting a preamble set into at least the at least one first contention-based preamble and the at least one second contention-based preamble.

5. The apparatus according to claim 4, the indication further indicative of splitting the preamble set into at least a non-contention-based preamble.

6. The apparatus according to claim 4, the indication including a single bit indicative of splitting the preamble set.

7. The apparatus according to claim 1, wherein the attempt is determined not to be successful when no non-contention-based preambles remain available, an allocation of a non-contention-based preamble has expired, or when the priority of the access attempt is below a threshold.

8. An apparatus comprising:
    at least one processor; and
    at least one memory including computer program code, the at least one memory and the computer program code configured, with the at least one processor, to cause the apparatus to perform at least the following:
    determine configuration information specifying at least one first contention-based preamble having a lower level of contention severity than at least one second contention-based preamble, the configuration information including an indication indicative of a selection probability of the at least one first contention-based preamble; and
    transmit the configuration information designating the at least one first contention-based preamble for usage by at least one user equipment when no contention-free preamble is obtainable for a contention-free random access request and designating the at least one first contention-based preamble and the at least one second contention-based preamble for selecting by at least one user equipment for a contention-based random access request,
    wherein the configuration information specifies the lower level of contention severity as an indication of a selection probability for the at least one first contention-based preamble.

9. The apparatus according to claim 8, wherein the selection probability is determined at least according to at least one of a loading information and a user equipment release information.

10. The apparatus according to claim 8, wherein the configuration information comprises an indication indicative of splitting a preamble set into at least the at least one first contention-based preamble and the at least one second contention-based preamble.

11. A method comprising:
    determining configuration information specifying at least one first contention-based preamble having a lower level of contention severity than at least one second contention-based preamble, the configuration information including an indication indicative of a selection probability of the at least one first contention-based preamble;
    attempting, when an non-contention-based random access attempt is selected, to select a non-contention-based preamble;
    transmitting, depending on whether the attempting is successful, the access attempt with the non-contention-based preamble or a selected one of the at least one first contention-based preamble; and
    selecting the at least one first contention-based preamble with a lower selection probability than the at least one second contention-based preamble.

12. The method according to claim 11, further comprising:
    selecting, when a contention-based random access attempt is selected, a contention-based preamble from the at least one first contention-based preamble and the at least one second contention-based preamble substantially randomly such that the at least one first contention-based preamble is selectable according to the lower level of contention severity.

13. A computer program product comprising a non-transitory computer-readable storage medium bearing computer program code embodied therein for use with a computer, the computer program code comprising:

code for determining configuration information specifying at least one first contention-based preamble having a lower level of contention severity than at least one second contention-based preamble, the configuration information including an indication indicative of a selection probability of the at least one first contention-based preamble;

code for attempting, when a non-contention-based random access attempt is selected, to select a non-contention-based preamble;

code for transmitting, depending on whether the attempting is successful, the access attempt with the non-contention-based preamble or a selected one of the at least one first contention-based preamble; and code for selecting the at least one first contention-based preamble with a lower selection probability than the at least one second contention-based preamble.

14. A method comprising:

determining configuration information specifying at least one first contention-based preamble having a lower level of contention severity than at least one second contention-based preamble, the configuration information including an indication indicative of a selection probability of the at least one first contention-based preamble; and transmitting the configuration information designating the at least one first contention-based preamble for usage by at least one user equipment when no contention-free preamble is obtainable for a contention-free random access request and designating the at least one first contention-based preamble and the at least one second contention-based preamble for selecting by at least one user equipment for a contention-based random access request, wherein the configuration information specifies the lower level of contention severity as an indication of a selection probability for the at least one first contention-based preamble.

15. A computer program product comprising a non-transitory computer-readable storage medium bearing computer program code embodied therein for use with a computer, the computer program code comprising:

code for determining configuration information specifying at least one first contention-based preamble having a lower level of contention severity than at least one second contention-based preamble, the configuration information including an indication indicative of a selection probability of the at least one first contention-based preamble; and code for transmitting the configuration information designating the at least one first contention-based preamble for usage by at least one user equipment when no contention-free preamble is obtainable for a contention-free random access request and designating the at least one first contention-based preamble and the at least one second contention-based preamble for selecting by at least one user equipment for a contention-based random access request, wherein the configuration information specifies the lower level of contention severity as an indication of a selection probability for the at least one first contention-based preamble.

16. The apparatus according to claim 8, wherein the configuration information specifies the lower level of contention severity as an indication of a selection probability for the at least one first contention-based preamble.

17. The method according to claim 11, further comprising: determining the configuration information from a signal received from a base station.

18. The method according to claim 11, wherein the configuration information comprises an indication indicative of splitting a preamble set into at least the at least one first contention-based preamble and the at least one second contention-based preamble.

19. The method according to claim 11, wherein attempting is determined not to be successful when no non-contention-based preambles remain available, an allocation of a non-contention-based preamble has expired, or when the priority of the access attempt is below a threshold.

20. The method according to claim 14, wherein the configuration information comprises an indication indicative of splitting a preamble set into at least the at least one first contention-based preamble and the at least one second contention-based preamble.

* * * * *